United States Patent
Laurent et al.

[15] 3,678,034
[45] July 18, 1972

[54] 2-CHLORO-Δ1,4-STEROIDS

[72] Inventors: Henry Laurent; Karl Heinz Kolb; Rudolf Wiechert, all of Berlin, Germany

[73] Assignee: Schering Aktiengesellschaft, Berlin and Berg Kamen, Germany

[22] Filed: April 22, 1970

[21] Appl. No.: 30,934

[30] Foreign Application Priority Data

April 23, 1969 Germany......................P 19 21 397.9
April 23, 1969 Germany......................P 19 21 398.0
June 19, 1969 Germany......................P 19 31 508.3

[52] U.S. Cl..................260/239.55, 260/397.45, 424/243
[51] Int. Cl.....................................................C07c 169/32
[58] Field of Search..........................260/239.55, 397.45;
Machine Searched Steriods

*Primary Examiner*—Elbert L. Roberts
*Attorney*—Michael S. Striker

[57] ABSTRACT

Novel 2-chloro-Δ1,4-steroids having the formula

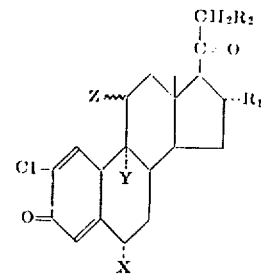

(1)

wherein $R_1$ is hydrogen or methyl, $R_2$ is hydrogen, hydroxyl or esterified hydroxyl, X is fluorine, chlorine or methyl, Y is hydrogen or halogen, and Z is halogen having the same or a smaller atomic weight then Y, a β-position hydroxyl and in the case where Y is hydrogen, an α-position hydroxyl.

37 Claims, No Drawings

2-CHLORO-Δ1,4-STEROIDS

The instant invention relates to a novel series of 2-chloro-Δ1,4-steroids having pharmacological activity.

The 2-chloro-Δ1,4-steroids of the invention may be designated by the following formula:

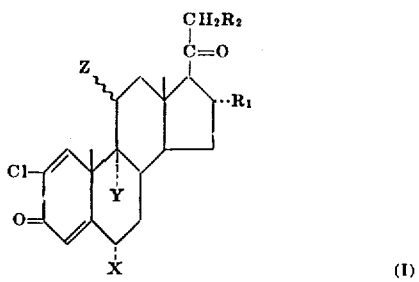

(I)

wherein $R_1$ is hydrogen or methyl, $R_2$ is hydrogen, hydroxyl or esterified hydroxyl, X is fluorine, chlorine or methyl, Y is hydrogen or halogen and Z is halogen having the same or a lesser atomic weight then Y, a β-position hydroxyl and in the case where Y is hydrogen Z can also be an α-position hydroxyl.

The steroids corresponding to the above formula can be prepared by a. adding on to the Δ1-double bond of a compound having the following formula:

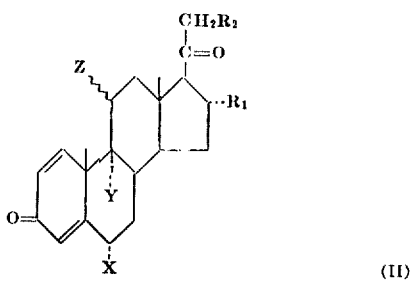

(II)

wherein $R_1$, X, Y and Z have the same meaning as given above and $R_2$ is hydrogen or an esterified group a chlorine atom in the presence of an inert polar solvent and thereafter subjecting the thusly recovered mixture consisting of the 1,2-dichloro-Δ1-compound and the 2-chloro-Δ1,4-compound to a chromatographic separation or treatment with a tertiary amine, and if desired the esterified 21-hydroxyl group can be saponified and then if desired re-esterified, or b. for the preparation of products where Y is a halogen atom treating a compound having the following formula:

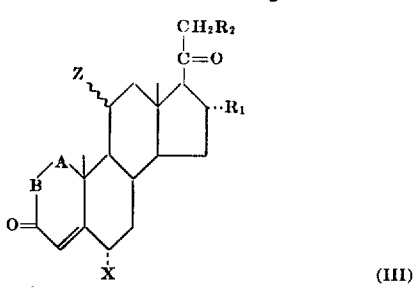

(III)

wherein X and $R_1$ are as above set out, Z is an α- or β-position hydroxyl group, $R_2$ is hydrogen or an esterified hydroxyl group and —B—A designates:

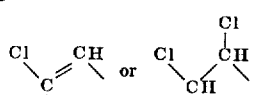

in the conventional manner for splitting off the 11-position hydroxyl group under simultaneous splitting off if necessary of the present 1-position chlorine atom as hydrogen chloride and then adding halogen, hypochlorous or hypobromous acid onto the formed Δ9(11)-double bond, and if desired converting the resultant 9-halogen-11-hydroxy compound into the 9,11β-epoxide and thereafter cleaving the epoxide ring with hydrogen fluoride, and also if desired saponifying the esterified 21-hydroxy group and if further desired re-esterifying the same.

For the esterification, there are suitable the conventional acids and acid derivatives used in steroid chemistry. Preferred acids are organic carboxylic acids containing up to 15 carbon atoms. The acids can be unsaturated, branched, polybasic or conventionally substituted, as for instance with hydroxy-,oxo-, or amino groups or with halogen atoms. There are suitable for use in the process of the invention cycloaphatic, aromatic, mixed aromatic-aliphatic or heterocyclic acids which can also be substituted. Instances of suitable acids are for example formic acid, acetic acid, propionic acid, butyric acid, valerianic acid, caproic acid, enanthic acid, undecylic acid, trimethylacetic acid, diethylacetic acid, t-butylacetic acid, phenylacetic acid, cyclopentyl propionic acid, oleic acid, lactic acid, mono-, di- and trichloracetic acid, aminoacetic acid, diethylaminoacetic acid, piperidinoacetic acid, succinic acid, adipic acid, benzoic acid, nicotinic acid, etc. Further, there may be advantageously used the common inorganic acids such as sulfuric and phosphoric acid.

For the preparation of water soluble products, the substituted aminoacylates such as diethylamino- and piperidino acetate can be converted into acid addition salts, dicarboxylic acid semi-esters and the sulfuric acid and phosphoric acid esters into the alkali metal salts.

The feasibility of the process of the invention according to procedure (a) is most surprising since it is known that the 11β-hydroxy group of prednisolone must be converted into the trifluoroacetoxy group before the chlorination (U.S. Pat. No. 3,232,835) if a simultaneous oxidation of the 11β-hydroxy group into the 11-keto group is to be avoided. In the process of the invention there are employed starting materials which are substituted in the 6-position which makes unnecessary any protection of the 11β-hydroxy group.

The chlorination in the procedure (a) of the invention can be carried out with chlorine or with chlorine containing compounds capable of liberating positive and negative chlorine in an inert polar solvent. Reagents which liberate positive chlorine are illustrated for example by chlorosuccinimide and chloroacetamide. As reagents which liberate negative chlorine, there may be mentioned hydrogenchloride and alkali metal chlorides.

The procedure as designated (a) is carried out in accordance with the invention in an inert polar solvent. As solvents for this purpose, there may be used lower carboxylic acids such as acetic acid and propionic acid, cyclic ethers such as tetrahydrofuran and dioxan, lower alkylethers, for example diethylether and dibutylether, lower alkylnitriles, as for instance acetonitrile and propionitrile, and the like.

The chlorination is preferably carried out at temperatures between −20° and −50°C.

The chlorination products which are isolated are mixtures of 1α,2β-dichloro-Δ1-11-hydroxy- and 2-chloro-Δ1,4-11-hydroxy-steroids. They are separated for example by chromatography. The primary recovered 1,2- dichloro-compound can however be completely converted into the 2-monochloro-Δ1-compound by reaction with a tertiary amine. Examples of tertiary amines which can be used for this purpose, i.e., for the splitting off of hydrogen chloride include N,N-dialkyl-aniline, triethylamine, pyridine, quinoline, collidine, lutidine, picoline and the like. Also in the saponification of the 21-ester, the labile dichloro-compounds are converted into the monochloro compounds.

The process variation (b) is carried out in the conventional manner. One possibility for splitting off water from the 9,11-position lies in reacting the 11-hydroxy-21-acetoxy-steroid with an acid chloride, as for instance methanesulfonic acid chloride, in the presence of an organic base such as pyridine and dimethylformamide under heating of the mixture. If 1,2- dichlorosteroids are used as starting materials, a simultaneous splitting off of hydrogen chloride from the 1,2 position takes place to produce the corresponding 2-chloro-$\Delta^1$-steroid.

The addition of halogen to the $\Delta^{9(11)}$-double bond according to process variation (b) can be carried out by a large number of procedures. For instance, halogen, that is chlorine or bromine or mixed halogenes, as for example, in chloromonofluoride or bromomonochloride, or halogen in the form of a polyhalogenide, for example, potassium triiodide or iodobenzenedichloride can be directly added on to the double bond.

A particularly good method for carrying out the halogen addition is to provide a positive and negative halogen for effecting the $\Delta^{9(11)}$-addition. Instances of reagents containing positive halogen include for example, halogensuccinimide, halogenacetamide or the halogens themselves. Examples of reagents for supplying negative halogen are the hydrogenhalides and the alkali metal halogenides, in particular lithiumhalogenide, for instance lithiumchloride and lithium-bromide.

The addition of the halogen to the $\Delta^{9(11)}$-double bond of the steroid takes place so that the positively charged halogen adds on at the 9-position and the negatively changed halogen adds on at the 11-position of the molecule. The halogen atom in the 9-position must have an atomic weight which is not less than that of the halogen atom in the 11-position because of the known differences in electronegativities of the halogens. The halogen addition at the $\Delta^{9(11)}$-double bond is preferably carried out at temperatures between $-75°$ and $+50°C$.

The addition of hypohalogeneous acids to the $\Delta^{9(11)}$-double bond of the steroid is carried out using the known methods. A preferred method comprises treating the $\Delta^{9(11)}$-double bond with a reagent which in the presence of water and in an acid reaction medium liberates hypochlorous or hypobromous acid, and in particular with halogen cation forming reagents such as for example, dibromomethyl-hydantoin, N-halogenacylamide, preferably N-chloro- or N-bromoacetamide or N-halogenacylimides, particularly N-bromo- or N-chloro-succinimide.

If the desired final products are 9α-fluoro compounds, then following the addition of the hypohalogenite to the 9,11-double bond, the 9α-bromo- (or chloro-) 11β-hydroxy group can in the known manner as for instance by treatment with basic reagents such as $NaOH, KOH, K_2CO_3$, potassium acetate, pyridine and the like, and preferably at elevated reaction temperature, be converted into a 9,11-oxido ring. The epoxy group can thereafter by treatment with hydrofluoric acid be converted into the 11β-hydroxy-9α-fluoro- group.

The novel compounds of the invention when employed in the vaso-constriction test on male subjects demonstrated after local application a marked inflammation inhibiting activity. The results of these tests are set out in a table which follows and in which Examples II to VI are compounds of the invention and are compared with the known compound 6α-fluoro-11β,21-dihydroxy-16α-methyl-1,4-pregnadiene-3,20-dione.

The vasoconstriction test as reported in the table was carried out as follows: The backs of male subjects 18–38 years of age were subjected to 20 repeated scrapings with a 2 cm wide Tesafilm which served to cut up the Stratumcorneum and produce a marked hyperemia. There was then applied to designated 4 cm² size areas of the stripped backs under identical conditions about 50 mg of a water/oil ointment base which contained 0.1%, 0.01% or 0.001% of the test substance. The backs of the subjects were photographed at designated time intervals using Kodak-color film. The evaluation of the hyperemia and vasoconstriction were made by converting the color of each skin area as recorded on the Kodak-color film into brightness values. Differences in brightness of the color films are by means of a diaphragm projected on an interference filter. As a brightness indicator there is used a secondary electron multiplier and the determination of the color value carried out by measuring the anode current of the secondary multiplier.

In order to evaluate the vasoconstriction, the same being representative of the syndrome of inflammation inhibition and relative to the onset of activity, degree of activity and duration of activity, the color values of the untreated and of the treated stripped skin were determined and compared with the color value of the normal skin, wherein the color value of the normal skin was set at 100 and of the untreated stripped skin at zero. Low-grade, average and high-grade vasoconstriction are designated by values between zero and 100.

TABLE I

| Compound | Dosage in % | Observation time in hours | | | |
|---|---|---|---|---|---|
| | | 1 | 2 | 3 | 4 |
| I 6α-fluoro-11β, 21-dihydroxy-16α-methyl-1,4-pregnadiene-3,20-dione | 0.1 | 5 | 35 | 65 | 100 |
| | 0.01 | 0 | 20 | 40 | 50 |
| | 0.001 | 0 | 20 | 40 | 55 |
| II 6α-fluoro-2-chloro-11β,21-dihydroxy-16α-methyl-1,4-pregnadiene-3,20-dione | 0.1 | 10 | 55 | 90 | 100 |
| | 0.01 | 5 | 35 | 85 | 100 |
| III 6α-fluoro-2-chloro-11β-hydroxy-21-trimethylacetoxy-16α-methyl-1,4-pregnadiene-3,20-dione | 0.1 | 10 | 50 | 100 | |
| | 0.01 | 10 | 40 | 90 | 100 |
| IV 6α,9α-difluoro-2-chloro-11β-hydroxy-21-acetoxy-16α-methyl-1,4-pregnadiene-3,20-dione | 0.1 | 20 | 70 | 100 | |
| | 0.01 | 15 | 75 | 100 | |
| | 0.001 | 5 | 30 | 80 | 100 |
| V 6α-fluoro-2,9-dichloro-11α-hydroxy-21-acetoxy-16α-methyl-1,4-pregnadiene-3,20-dione | 0.1 | 10 | 45 | 100 | |
| | 0.01 | 10 | 30 | 75 | 100 |
| | 0.001 | 0 | 25 | 40 | 80 |
| VI 6α-fluoro-2,9,11β-trichloro-21-acetoxy-16α-methyl-1,4-pregnadiene-3,20-dione | 0.1 | 10 | 30 | 60 | 100 |
| | 0.01 | 5 | 30 | 50 | 90 |

The data in the table unequivocably establishes that the use of the compounds of the invention produced an early onset of action and the maximum effect was reached sooner than with the comparison compound.

The novel compounds of the invention can be formulated with the conventional additives and carriers to produce compositions suitable for use by local application in the treatment of contact dermatitis, eczema of various types, neurodermatitis, erythematodes cutaneous, psoriasis, Lichen ruber planus, burns (grade I), pruritus vulvae and ani, Rosacea, and verrucosus and by oral administration in the treatment of acute or chronic polyarthritis, neurodermititis, asthma, bronchitis, hay fever and the like.

The following Examples are given to further illustrate the invention, but are not to be taken as limitative of the scope thereof.

EXAMPLE 1

A solution of 25.0 g. 6α-fluoro-11β-hydroxy-21-acetoxy-16α-methyl-1,4-pregnadiene-3,20-dione in 125 ml tetrahydrofuran and 250 ml methylenechloride was reacted at $-10°C$ with 50 g N-chloro-succinimide and 62.5 ml HCl saturated dioxan. After 10 minutes the reaction mixture was poured into water, extracted with methylene chloride, the extract washed with sodium sulfite, sodium hydrogencarbonate solution and water, dried over sodium sulfate and the solvent evaporated off. The crude product was chromatographed on silica gel. 1.3–1.9 percent. Acetone-methylene-chloride eluted 5.95 g 6α-fluoro-1α,2β-dichloro-11β-hydroxy-21-acetoxy-16α-methyl-4-pregnadiene-3,20-dione having a melting point of 177°–178°C (out of acetone-hexane); $[\alpha]_D^{25} = +120°$(chloroform). $UV: \epsilon_{248} = 13,100$ (methanol). 1.9–2.8 percent acetone-methylene-chloride eluted 9.4 g 6α-fluoro-2-chloro-11β-hydroxy-21-acetoxy-16α-methyl-1,4-pregnadiene-3,20-dione having a melting point of 207°–209°C; $[\alpha]_D^{25} = +86°$ (chloroform). $UV: \epsilon_{249} = 14,800$ (methanol).

EXAMPLE 2

1.0 g 6α-fluoro-11β-hydroxy-21-acetoxy-16α-methyl-1,4-pregnadiene-3,20-dione dissolved in 10 ml tetrahydrofuran and 10 ml dimethylformamide was reacted with 20 ml propionic acid containing 5 percent dissolved chlorine and allowed to stand for 3 hours at room temperature. The reaction mixture was poured into water and the precipitated material separated out and dissolved in 25 ml pyridine. After 24 hours the pyridine solution was poured into ice water. The separated product was chromatographed on silica gel. 21–26 percent. Acetone-pentane eluted 405 mg 6α-fluoro-2-chloro-11β-hydroxy-21-acetoxy-16α-methyl-1,4-pregnadiene-3,20-dione having a melting point of 207°–211°C (out of acetone-hexane).

EXAMPLE 3

A solution of 10.0 g 6α-fluoro-11β-hydroxy-21-trimethylacetoxy-16α-methyl-1,4-pregnadiene-3,20-dione in 50 ml tetrahydrofuran and 100 ml methylenechloride was reacted at 0°C with 20 g N-chloro-succinimide and 20 ml HCl saturated dioxan. After 20 minutes the reaction mixture was poured into water, the precipitated product isolated and dissolved in 100 ml pyridine. The solution was heated for 2 hours at 60°C and then poured in HCl containing ice water. The mixture was extracted with methylenechloride, washed with dilute hydrochloric acid, sodium hydrogen carbonate and water, dried over sodium sulfate and the solvent evaporated off. The crude product was chromatographed on silica gel. 7–9 percent Acetone-methylene chloride eluted 7.1 g 6α-fluoro-2-chloro-11β-hydroxy-21-trimethylacetoxy-16α-methyl-1,4-pregnadiene-3,20-dione having a melting point of 156°–158°C (out of acetone-hexane).

EXAMPLE 4

1.1 g 6α-fluoro-1α,2β-dichloro-11β-hydroxy-21-acetoxy-16α-methyl-4-pregnene-3,20-dione were dissolved in 11 ml methylene chloride and 17 ml methanolic 0.2 N KOH solution were then introduced. After 20 minutes, the reaction mixture was diluted with methylene chloride and washed till neutral with water. The organic phase was dried and concentrated and the residue chromatographed on silica gel. 7.5–12.8 percent Acetone-methylenechloride eluted 670 mg 6α-fluoro-2-chloro-11β,21-dihydroxy-16α-methyl-1,4-pregnadiene-3,20-dione having a melting point of 211°–215°C (out of methylene chloride-hexane), $[\alpha]_D^{25}$ = +66°(chloroform). UV:$\epsilon_{250}$=14,800 (methanol).

EXAMPLE 5

2.0 g 6α-fluoro-2-chloro-11β-hydroxy-21-acetoxy-16α-methyl-1,4-pregnadiene were saponified as described in Example 4. The crude product was crystallized out of acetone-hexane. The yield amounted to 1.32 g 6α-fluoro-2-chloro-11β,21-dihydroxy-16α-methyl-1,4-pregnadiene-3,20-dione having a melting point of 210°–213°C (out of acetone-hexane).

EXAMPLE 6

Three hundred mg 6α-fluoro-2-chloro-11β,21-dihydroxy-16α-methyl-1,4-pregnadiene-3,20-dione were in 1.2 ml pyridine acetylated with 0.6 ml acetanhydride by allowing such mixture to stand for 45 minutes at room temperature. Following precipitation with water, the product was separated off with suction, washed, dried and crystallized out of acetone-hexane. There was recovered 255 mg 6α-fluoro-2-chloro-11β-hydroxy-21-acetoxy-16α-methyl-1,4-pregnadiene-3,20-dione having a melting point of 214°–215°C; $[\alpha]_D^{25}$ = +86° (chloroform). UV:$\epsilon_{249}$= 14,800 (methanol).

EXAMPLE 7

A solution of 1.2 g 6α-fluoro-2-chloro-11β,21-dihydroxy-16α-methyl-1,4-pregnadiene-3,20-dione in 4.8 ml pyridine was reacted with 2.4 ml butyric acid anhydride and allowed to stand for 24 hours at room temperature. The mixture was poured into icewater, the crude product filtered off with suction, dissolved in methylene chloride and the solution treated with steam. The residue from the steam distillation was isolated and chromatographed on silica gel 2.8–4.3 percent Acetone-methylene-chloride eluted 865 mg 6α-fluoro-2-chloro-11β-hydroxy-21-butyryloxy-16α-methyl-1,4-pregnadiene-3,20-dione having a melting point of 91°–93°C (out of acetone-hexane);$[\alpha]_D^{25}$ =+83°(chloroform). UV:$\epsilon_{249}$= 14,100 (methanol).

EXAMPLE 8

A solution of 1.2 g 6α-fluoro-2-chloro-11β,21-dihydroxy-16 α-methyl-1,4-pregnadiene-3,20-dione in 12 ml methylenechloride was reacted with 2.4 ml trimethylacetic acid anhydride and 6 ml 20 percent aqueous soda lye. The mixture was refluxed under intensive stirring, thereafter diluted with methylene chloride and washed till neutral with water. Following drying and evaporation of the solvent, there was recovered an oil which was chromatographed on silica gel. 7.0–9.5 percent Acetone-methylene chloride eluted 1.21 g 6α-fluoro-2-chloro-11β-hydroxy-21-trimethylacetoxy-16α-methyl-1,4-pregnadiene-3,20-dione having a melting point of 157°–158°C (out of acetone-hexane); $[\alpha]_D^{25}$ = +82°(chloroform). UV:$\epsilon_{249}$=14,100 (methanol).

EXAMPLE 9

A solution of 1.0 g 6α-fluoro-2-chloro-11β,21-dihydroxy-16 α-methyl-1,4-pregnadiene-3,20-dione in 4 ml pyridine and 2 ml caproic acid anhydride was allowed to stand for 24 hours at 25°C. The solution was then poured into ice water and extracted with methylene chloride. The extract was washed with dilute hydrochloric acid, sodium hydrogencarbonate solution and water, dried and chromatographed on silica gel. 7–10 percent Acetone-pentane eluted 833 mg 6α-fluoro-2-chloro-11β-hydroxy-21-hexanoyloxy-16α-methyl-1,4-pregnadiene-3,20-dione as a colorless, viscous oil. $[\alpha]_D^{25}$ = +80°(chloroform) UV:$\epsilon_{249}$=14,600 (methanol)

EXAMPLE 10

7.0 ml pyridine was cooled down to −15°C and reacted with 0.4 ml freshly distilled sulfur trioxide. At a temperature of about 0°C, 3.0 g 6α-fluoro-2-chloro-11β,21-dihydroxy-16α-methyl-1,4-pregnadiene-3,20-dione was introduced into the mixture and stirring continued for 1 hour whereupon the temperature increased from 0°C to room temperature. The mixture was diluted with 65 ml water, brought to a pH of 8.6 with 22.2 ml of soda lye and repeatedly extracted with methylenechloride for removal of the pyridine. The aqueous phase was evaporated in vacuo at 40°C and the residue digested with methanol. The undissolved sodium sulfate was filtered off and the methanol evaporated. The residue was taken up in a small amount of methanol and crystallized by the addition of ether thereto. There were recovered 2.52 g sodium-(6α-fluoro-2-chloro-11β-hydroxy-3,20-dioxo-16α-methyl-1,4-pregnadiene-21-yl)-sulfate having a melting point of 181°–185°C. $[\alpha]_D^{25}$ = +65°(methanol). UV: $\epsilon_{250}$= 14,800 (methanol).

EXAMPLE 11

1.4 g 6α-fluoro-2-chloro-11β,21-dihydroxy-16α-methyl-1,4-pregnadiene-3,20-dione in 2.8 ml pyridine were reacted with 1.4 ml valerianic acid anhydride and the reaction mixture stirred for 3 hours at room temperature. The reaction mixture was then subjected to steam distillation. The reaction product was isolated from the distillation residue with methylenechloride and crystallized out of acetone-hexane. The yield amounted to 970 mg 6α-fluoro-2-chloro-11β-hydroxy-21-valeryloxy-16α-methyl-1,4-pregnadiene-3,20-dione having a melting point of 192°–195°C. $[\alpha]_D^{25}$ = +98° (chloroform). UV:$\epsilon_{249}$= 15,300 (methanol).

EXAMPLE 12

2.0 g 6α-fluoro-11α-hydroxy-21-acetoxy-16α-methyl-1,4-pregnadiene-3,20-dione were dissolved in 10 ml tetrahydrofuran and 20 ml methylenechloride and reacted at −10°C with 4.0 g N-chlorosuccinimide and 5.2 ml HCl saturated dioxan. After 15 minutes, the reaction mixture was poured into water and extracted with methylenechloride. The extract was washed with sodium hydrogensulfite- sodium hydrogencarbonate solution and water and after drying over sodium sulfate, evaporated. The residue was chromatographed on silica gel. 20–25 percent Acetone-hexane eluted 655 mg 6α-fluoro-2-chloro-11α-hydroxy-21-acetoxy-16α-methyl-1,4-pregnadiene-3,20-dione having a melting point of 216°–218.5 °C (out of acetone-hexane). $[\alpha]_D^{25} = +41°$ (chloroform). UV: $\epsilon_{250} = 15,800$ (methanol).

EXAMPLE 13

A mixture of 5.9 g 6α-fluoro-1α,2β-dichloro-11β-hydroxy-21-acetoxy-16α-methyl-4-pregnene-3,20-dione, 29.5 ml dimethylformamide, 5.9 ml pyridine and 2.95 ml methanesulfochloride was heated for 80 minutes under nitrogen. After cooling, the mixture was poured into water, the precipitated product isolated and chromatographed on silica gel. 2.2–3.6 percent Acetone-methylenechloride eluted 3.43 g 6α-fluoro-2-chloro-21-acetoxy-16α-methyl-1,4,9(11)-pregnatriene-3,20-dione having a melting point of 161°–162°C (out of acetone-hexane); $[\alpha]_D^{25} = +116°$ (chloroform). UV: $\epsilon_{245} = 16,000$ (methanol).

EXAMPLE 14

9.2 g 6α-fluoro-2-chloro-11β-hydroxy-21-acetoxy-16α-methyl-1,4-pregnadiene-3,20-dione were reacted with methane-sulfochloride in dimethylformamide-pyridine as described in Example 13. The yield amounted to 7.65 g 6α-fluoro-2-chloro-21-acetoxy-16α-methyl-1,4,9(11)-pregnatriene-3,20-dione having a melting point of 159°–160°C (out of acetone-hexane).

EXAMPLE 15

A solution of 3.0 g 6α-fluoro-2-chloro-21-acetoxy-16α-methyl-1,4,9(11)-pregnatriene-3,20-dione in 120 ml dioxan was reacted with 30 ml water, 12g N-chlorosuccinimide and 12 ml 70 percent perchloric acid and the reaction mixture stirred for 1 hour at room temperature. The reaction mixture was poured into sodium sulfite containing water, the precipitated product suctioned off, washed, dried and chromatographed on silica gel. 2.3–4.3 percent acetone-methylenechloride eluted 1.23 g 6α-fluoro-2,9-dichloro-11β-hydroxy-21-acetoxy-16α-methyl-1,4-pregnadiene-3,20-dione having a melting point of 120°–121°C (out of methanol); $[\alpha]_D^{25} = +104°$ (chloroform). UV: $\epsilon 246 = 14,800$ (methanol).

EXAMPLE 16

A solution of 8.5 g 6α-fluoro-2-chloro-21-acetoxy-16α-methyl-1,4,9(11)-pregnatriene-3,20-dione in 340 ml dioxane was reacted with 85 ml water, 8.5 g N-bromosuccinimide and 8.5 ml 70 percent perchloric acid. After 50 minutes, the reaction mixture was poured in sodium sodium sulfite containing ice-water and the precipitated product isolated. The yield of crude product amounted to 10.3g. 500 mg were crystallized out of methylenechloride-acetone-hexane and yielded 400 mg 6α-fluoro-bq-chloro-9-bromo-11β-hydroxy-21-acetoxy-16α-methyl-1,4-preg-nadiene-3,20-dione having a melting point of 183°–185°C(decomp.). $[\alpha]_D^{25} = +93°$(chloroform); UV:$\epsilon_{249} = 13,300$ (methanol).

EXAMPLE 17

9.8g 6α-fluoro-2-chloro-9-bromo-11β-hydroxy-21-acetoxy-16α-methyl-1,4-pregnadiene-3,20-dione were dissolved in 250 ml ethanol, reacted with 12.5 g potassium acetate and heated for 2 hours under reflux. The reaction product was isolated by water precipitation and then chromatographed on silica gel. 14–17 percent Acetone-pentane eluted 6.6g of crude product. Two hundred mg were crystallized out of acetone-hexane and yielded 145 mg 6α-fluoro-2-chloro-21-acetoxy-9,11β-epoxy-16α-methyl-1,4-pregnadiene-3,20-dione having a melting point of 140.5°–142°C; $[\alpha]_D^{25} = +38°$(chloroform). UV: $\epsilon_{253} = 15,200$ (methanol).

EXAMPLE 18

Nineteen ml dimethylformamide were reacted with 19 ml anhydrous hydrogen fluoride at −50°C. 6.4g 6α-fluoro-2-chloro-21-acetoxy-9,11β-epoxy-16α-methyl-1,4-pregnadiene-3,20-dione were dissolved in the resulting mixture and the solution allowed to stand for 5 days at room temperature. It was then poured into 1,300 ml water which contained 130 g potassium hydrogen carbonate. The precipitated material was separated off with suction and dissolved in methylenechloride, the solution dried with sodium sulfate and evaporated. The residue was chromatographed on silica gel. 4.7–7.8 percent acetone-methylene chloride eluted 2.62 g 6α,9-difluoro-2-chloro-11β-hydroxy-21-acetoxy-16α-methyl-1,4-pregnadiene-3,20-dione having a melting point of 204°–205°C (out of acetone-hexane); $[\alpha]^{25} = +84°$(chloroform); UV:$\epsilon_{244}=\Phi$ 16,200 (methanol).

EXAMPLE 19

Four hundred 6α-fluoro-2,9-dichloro-11β-hydroxy-21-acetoxy-16α-methyl-1,4-pregnadiene-3,20-dione were dissolved in 8 ml methylene chloride. 8 ml Methanolic 0.2N potassium hydroxide were then introduced into the solution and stirring at room temperature under nitrogen carried out for 10 minutes. The reaction mixture was diluted with methylene chloride, washed with water until neutral, dried and concentrated under vacuum. The residue was chromatographed. 11–13.5percent acetone-methylenechloride eluted 155 mg 6α-fluoro-2,9-dichloro-11β,21-dihydroxy-16α-methyl-1,4-pregnadiene-3,20-dione having a melting point of 249°–250°C(from methylenechloride); $[\alpha]_D^{25} = +95°$ (chloroform); UV $\epsilon_{245} = 15,200$ (methanol).

EXAMPLE 20

2.42 g 6α,9-difluoro-2-chloro-11β-hydroxy-21-acetoxy-16α-methyl-1,4-pregnadiene-3,20-dione were saponified with potassium hydroxide solution as described in Example 19. The crude product was chromatographed on silica gel. 22–27 percent acetone-hexane eluted 1.23 g 6α,9-difluoro-2chloro-11β,21-dihydroxy-16α-methyl-1,4-pregnadiene-3,20-dione having a melting point of 190°–200°C; $[\alpha]_D^{25} = +63°$ (chloroform). UV: $\epsilon_{246}= 15,100$ (methanol).

EXAMPLE 21

A solution of 927 mg 6α, 9-difluoro-2-chloro-11β,21-dihydroxy-16α-methyl-1,4-pregnadiene-3,20-dione in 9.5 ml methylenechloride was reacted with 1.85 ml trimethylacetic acid anhydride and 4.6 ml 20 percent aqueous soda lye. The mixture was refluxed under intensive stirring, thereafter diluted with methylenechloride and washed until neutral with water. The solvent was evaporated off following drying over sodium sulfate and the residue chromatographed on silica gel. 8.8–10 percent Acetone-pentane eluted 840 mg 6α,9-difluoro-2-chloro-11β-hydroxy-21-trimethylacetoxy-16α-methyl-1,4-pregnadiene-3,20-dione having a melting point of 106°–108°C; $[\alpha]_D^{25} = +78°$ (chloroform); UV: $\epsilon_{247} = 16,200$ (methanol).

EXAMPLE 22

A solution of 1.7g 6α-fluoro-2-chloro-21-acetoxy-16α-methyl-1,4,9(11)-pregnatriene-3,20-dione in 85 ml concentrated acetic acid was reacted with 1.7g N-chlorosuccinimide, 8.5g lithiumchloride and 1.7 ml hydrogen chloride saturated dioxan. The mixture was stirred for 90 minutes at room temperature and then poured onto icewater containing sodium sulfite. The precipitated product was isolated and chromatographed on silica gel. 20–25 percent acetone-pentane eluted 514 mg 6α-fluoro-2,9-11β-trichloro-21-acetoxy-16β-methyl-1,4-pregnadiene-3,20-dione having a melting point of 223°–228°C (from acetone-hexane); $[\alpha]_D^{25} = +127°$(chloroform) UV: $\epsilon_{244} = 15,400$ (methanol).

EXAMPLE 23

3.0 g 6α-fluoro-2-chloro-21-acetoxy-16α-methyl-1,4,9(11)-pregnatriene-3,20-dione and 6.0g N-chlorosuccinimide were dissolved in a mixture of 6 ml anhydrous hydrogen fluoride, 9 ml tetrahydrofuran and 12 ml methylenechloride at −50°C. After 18 hours of reaction time, the reaction mixture at a temperature of 0°C was poured into water that contained sodium hydrogen carbonate and sodium hydrogensulfite. The precipitated material was isolated and chromatographed on silica gel. 13–15 percent acetone-pentane eluted 882 mg 6α,11β-difluoro-2,9-dichloro-21-acetoxy-16α-methyl-1,4-pregnadiene-3,20-dione having a melting point of 221°–224°C (from acetone-hexane); $[\alpha]_D^{25} = +81°$(chloroform); UV: $\epsilon_{244} = 14,800$(methanol).

EXAMPLE 24

1.0 g 6α,9-difluoro-2-chloro-11β,21-dihydroxy-16α-methyl-1,4-pregnadiene-3,20-dione in 2 ml pyridine was reacted with 1 ml valerianic acid anhydride and the reaction mixture stirred for 3 hours at room temperature. Reaction mixture was then subjected to steam distillation. The product was isolated from the steam distillation residue with methylenechloride and chromatographed on silica gel. 9–30 percent Acetone-pentane eluted 950 mg 6α,9-difluoro-2-chloro-11β-hydroxy-21-valeryloxy-16α-methyl-1,4-pregnadiene-3,20-dione having a melting point of 164°–165°C (from acetone-hexane); $[\alpha]_D^{25} = +91°$(chloroform); UV: $\epsilon_{245} = 16,100$ (methanol).

EXAMPLE 25

3.5 g 6α-fluoro-2,9-dichloro-11β,21-dihydroxy-16α-methyl-1,4-pregnadiene-3,20-dione were reacted with valerianic acid anhydride as described in Example 24. The crude product was chromatographed on silica gel. 30 percent Acetone-pentane eluted 1.96 g 6α-fluoro-2,9-dichloro-11β-hydroxy-21-valeryloxy-16α-methyl-1,4-pregnadiene-3,20-dione having a melting point of 197°–199°C (out of acetone-hexane). $[\alpha]_D^{25} = +110°$ (chloroform); UV: $\epsilon_{246} = 15,400$ (methanol).

EXAMPLE 26

5.7 ml pyridine were cooled down to −15°C and then reacted with 0.25 ml freshly distilled sulfur trioxide. At about 0°C, there were introduced into the reaction mixture, 1.78g 6α,9-difluoro-2-chloro-11β,21-dihydroxy-16α-methyl-1,4-pregnadiene-3,20-dione and stirring continued for 1 hour whereby the temperature of the mixture increased to room temperature. The mixture was then diluted with 40 ml water, the pH adjusted to 8.6 with 16.9 ml 1N soda lye and the pyridine removed by repeated extraction with methylenechloride. The aqueous phase was evaporated in vacuo at about 40°C and the residue digested in methanol. The undissolved material was filtered off and the solvent evaporated. The residue was taken up in a small amount of methanol and brought to crystallization by the addition of ether. The yield amount-ed to 1.32 g sodium-(6α,9-difluoro-2-chloro-11β-hydroxy-3,20-dioxo-16α-methyl-1,4-pregnadiene-21-yl)-sulfate having a melting point of 190°–194°C; $[\alpha]_D^{25} = +47°$ (methanol); UV: $\epsilon_{246} = 14,900$ (methanol).

EXAMPLE 27

1.9 g 6α-fluoro-2,9-dichloro-11β,21-dihydroxy-16β-methyl-1,4-pregnadiene-3,20-dione were reacted as described in Example 26. The yield amounted to 820 mg sodium-(6α-fluoro-2,9-dichloro-11β-hydroxy-3,20-dioxo-16α-methyl-1,4-pregnadiene-21-yl) sulfate having a melting point of 192°–197°C; $[\alpha]_D^{25} = +66°$(methanol); UV: $\epsilon_{247} = 13,500$(methanol).

EXAMPLE 28

4.0 g 6β,11β-difluoro-2,9-dichloro-21-acetoxy-16α-methyl-1,4-pregnadiene-3,20-dione were saponified with potassium hydroxide solution as described in Example 19. Following crystallization out of acetone/hexane, 1.5 g 6α,11β-difluoro-2,9-dichloro-21-hydroxy-16β-methyl-1,4-pregnadiene-3,20-dione having a melting point of 236°–239°C were recovered. $[\alpha]_D^{25} = +95°$ (chloroform); UV: $\epsilon_{244} = 15,200$ (methanol).

EXAMPLE 29

1.90 g 6α,11β-difluoro-2,9-dichloro-21-hydroxy-16α-methyl-1,4-pregnadiene-2,20-dione were esterified with valerianic acid as described in Example 24. The crude product was chromatographed. 6–8 percent Acetone/pentane eluted 1.33 g 6α,11β-difluoro-2,9-dichloro-21-valeryloxy-16α-methyl-1,4-pregnadiene-3,20-dione having a melting point of 66°–67C (out of acetone/hexane). $[\alpha]_D^{25} = +80°$ (chloroform) UV: $\epsilon_{244} = 14,100$ (methanol)

EXAMPLE 30

2.0 g 6α,11β-difluoro-2,9-dichloro-21-hydroxy-16β-methyl-1,4-pregnadiene-3,20-dione were esterified with trimethylacetic acid as set out in Example 21. The crude product was chromatographed. 6–8 percent Acetone/pentane eluted 1.85 g 6α,11β-difluoro-2,9-dichloro-21-trimethylacetoxy-16α-methyl-1,4-pregnadiene-3,20-dione having a melting point of 197°–198.5°C (out of acetone/hexane). $[\alpha]_D^{25} = +85°$ (chloroform). UV: $\epsilon_{244} = 15,700$ (methanol).

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A 2-chloro-$\Delta^{1,4}$-steroid selected from the group of compounds having the following formulas:

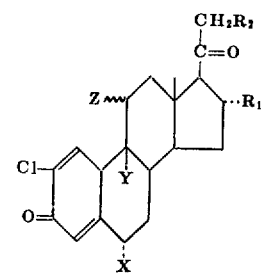

(I)

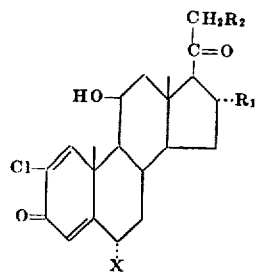

(IV)

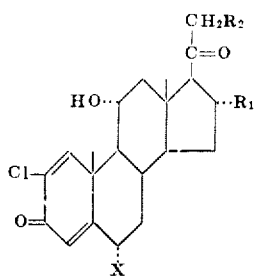

(VI)

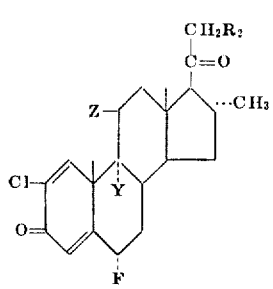

and

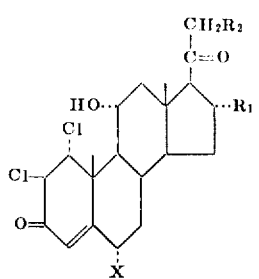

(VII)

wherein:
R₁ is hydrogen or methyl,
R₂ is hydroxyl or esterified hydroxyl,
X is fluorine, chlorine or methyl,
Y is halogen, and
Z is halogen having the same or a lesser atomic weight than Y, a β-position hydroxyl and where Y is hydrogen Z can also be an α-position hydroxyl.

2. Compound according to claim 1 designated 6α-fluoro-1α,2β-dichloro-11β-hydroxy-21-acetoxy-16α-methyl-4-pregnene-3,20-dione.

3. Compound according to claim 1 designated 6α-fluoro-2-chloro-11β-hydroxy-21-acetoxy-16α-methyl-1,4-pregnadiene-3,20-dione.

4. Compound according to claim 1 designated 6α-fluoro-2-chloro-11β-hydroxy-21-trimethylacetoxy-16α-methyl-1,4-pregnadiene-3,20-dione.

5. Compound according to claim 1 designated 6α-fluoro-2-chloro-11β,21-dihydroxy-16α-methyl-1,4-pregnadiene-3,20-dione.

6. Compound according to claim 1 designated 6α-fluoro-2-chloro-11β-hydroxy-21-butyryloxy-16α-methyl-1,4-pregnadiene-3,20-dione.

7. Compound according to claim 1 designated 6α-fluoro-2-chloro-11β-hydroxy-21-hexanoyloxy-16α-methyl-1,4-pregnadiene-3,20-dione.

8. Compound according to claim 1 designated sodium-(6α-fluoro-2-chloro-11β-hydroxy-3,20-dioxo-16α-methyl-1,4-pregnadiene-21-yl)-sulfate.

9. Compound according to claim 1 designated 6α-fluoro-2-chloro-11β-hydroxy-21-valeryloxy-16α-methyl-1,4-pregnadiene-3,20-dione.

10. Compound according to claim 1 designated 6α-fluoro-2-chloro-11α-hydroxy-21-acetoxy-16α-methyl-1,4-pregnadiene-3,20-dione.

11. a Compound designated 6α-fluoro-2-chloro-21-acetoxy-16α-methyl-1,4,9(11)-pregnatriene-3,20-dione.

12. Compound according to claim 1 designated 6α-fluoro-2,9-dichloro-11β-hydroxy-21-acetoxy-16α-methyl-1,4-pregnadiene-3,20-dione.

13. Compound according to claim 1 designated 6α-fluoro-2-chloro-9-bromo-11β-hydroxy-21-acetoxy-16α-methyl-1,4-pregnadiene-3,20-dione.

14. a Compound designated 6α-fluoro-2-chloro-21-acetoxy-9,11β-epoxy-16α-methyl-1,4-pregnadiene-3,20-dione.

15. Compound according to claim 1 designated 6α,9-difluoro-2-chloro-11β-hydroxy-21-acetoxy-16α-methyl-1,4-pregnadiene-3,20-dione.

16. Compound according to claim 1 designated 6α-fluoro-2,9-dichloro-11β-21-dihydroxy-16α-methyl-1,4-pregnadiene-3,20-dione.

17. Compound according to claim 1 designated 6α,9-difluoro-2-chloro-11β,21-dihydroxy-16α-methyl-1,4-pregnadiene-3,20-dione.

18. Compound according to claim 1 designated 6α,9-difluoro-2-chloro-11β-hydroxy-21-trimethylacetoxy-16α-methyl-1,4-pregnadiene-3,20-dione.

19. Compound according to claim 1 designated 6α-fluoro-2,9,11β-trichloro-21-acetoxy-16α-methyl-1,4-pregnadiene-3,20-dione.

20. Compound according to claim 1 designated 6α,11β-difluoro-2,9-dichloro-21-acetoxy-16α-methyl-1,4-pregnadiene-3,20-dione.

21. Compound according to claim 1 designated 6α,9-difluoro-2-chloro-11β-hydroxy-21-valeryloxy-16α-methyl-1,4-pregnadiene-3,20-dione.

22. Compound according to claim 1 designated 6α-fluoro-2,9-dichloro-11β-hydroxy-21-valeryloxy-16α-methyl-1,4-pregnadiene-3,20-dione.

23. Compound according to claim 1 designated sodium-(6α,9-difluoro-2-chloro-11β-hydroxy-3,20-dioxo-16α-methyl-1,4-pregnadiene-21-yl)-sulfate.

24. Compound according to claim 1 designated sodium-(6α-fluoro-2,9-dichloro-11β-hydroxy-3,20-dioxo-16α-methyl-1,4-pregnadiene-21-yl)-sulfate.

25. Compound according to claim 1 designated 6α,11β-difluoro-2,9-dichloro-21-hydroxy-16α-methyl-1,4-pregnadiene-3,20-dione.

26. Compound according to claim 1 designated 6α,11β-difluoro-2,9-dichloro-21-valeryloxy-16α-methyl-1,4-pregnadiene-3,20-dione.

27. Compound according to claim 1 designated 6α,11β-difluoro-2,9-dichloro-21-trimethylacetoxy-16α-methyl-1,4-pregnadiene-3,20-dione.

28. A compound according to claim 1 having the formula

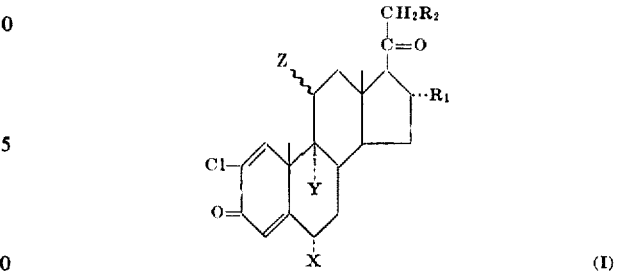

(I)

wherein R₁, R₂, X, Y and Z are as defined in claim 1

29. A compound according to claim 1 having the formula

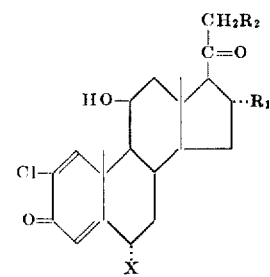

(IV)

wherein X, $R_1$ and $R_2$ are as defined in claim 1.

30. A compound according to claim 1 having the formula

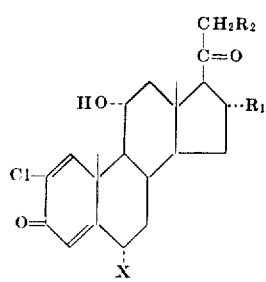

(V)

wherein X, $R_1$, & R $R_2$ are as defined in claim 1.

31. A compound according to claim 1 having the formula

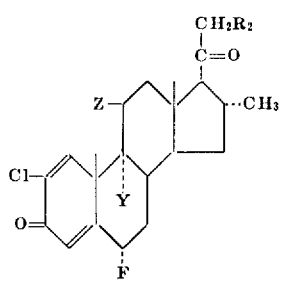

(VI)

wherein $R_2$ is hydroxyl or esterified hydroxyl, Y is halogen and Z is halogen having the same or a lesser atomic weight than Y or a β-position hydroxyl group.

32. A compound according to claim 1 having the formula

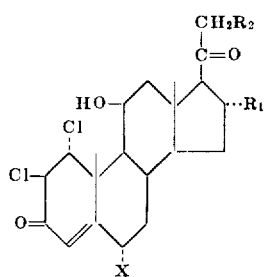

(VII)

wherein X and $R_1$ are as defined in claim 1 and $R_2$ is esterified hydroxyl.

33. Process for preparing a compound according to claim 1 which comprises adding chlorine on to the $\Delta^1$ - double bond of a compound having the formula

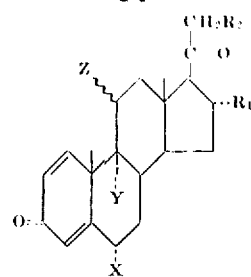

(II)

wherein $R_1$, X, Y and Z are as defined in claim 1 and $R_2$ is esterified hydroxyl in the presence of an inert polar solvent and separating the reaction mixture comprising 1,2-dichloro-$\Delta^4$-steroid and 2-chloro-$\Delta^{1,4}$-steroid into its components and converting said 1,2-dichloro-$\Delta^4$-steroid into 2-chloro-$\Delta^{1,4}$-steroid by treatment thereof with a tertiary amine.

34. Process according to claim 33 wherein said separation is carried by chromatography.

35. Process according to claim 33 wherein said reaction mixture is subjected to treatment with a tertiary amine selected from the group consisting of N,N-dialkyl-aniline, triethylamine, pyridine, quinoline, collidine, lutidine and picoline.

36. Process for preparing a compound according to claim 1 wherein Y designates halogen which comprises treating a compound having the formula

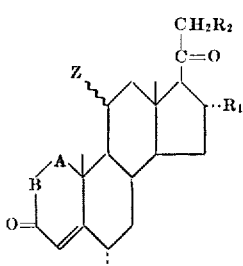

(III)

wherein $R_1$ and X are as defined in claim 1, $R_2$ is esterified hydroxyl and —B—A— is

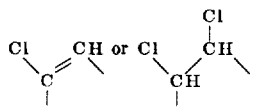

so that the 11-position hydroxyl group will be split off as water and simultaneously the 1-position chlorine atom is split off as hydrogen halide, thereafter adding on to the $\Delta^{9(11)}$-double bond, halogen or hypochlorous or hypobromous acid, wherein if the 21- hydroxyl group is esterified, the reaction product can be subjected to saponification to provide a 21-free hydroxyl group.

37. Process according to claim 36 which comprises subjecting the 9-halogen-11-hydroxy reaction product to epoxidation to form the corresponding 9,11β-epoxide and thereafter splitting the epoxide ring by addition of hydrogen fluoride.

* * * * *